Dec. 16, 1958  A. A. LIMBERG  2,864,432
INERTIA LATCH FOR VEHICLE SEATS
Filed Nov. 21, 1955  3 Sheets-Sheet 1
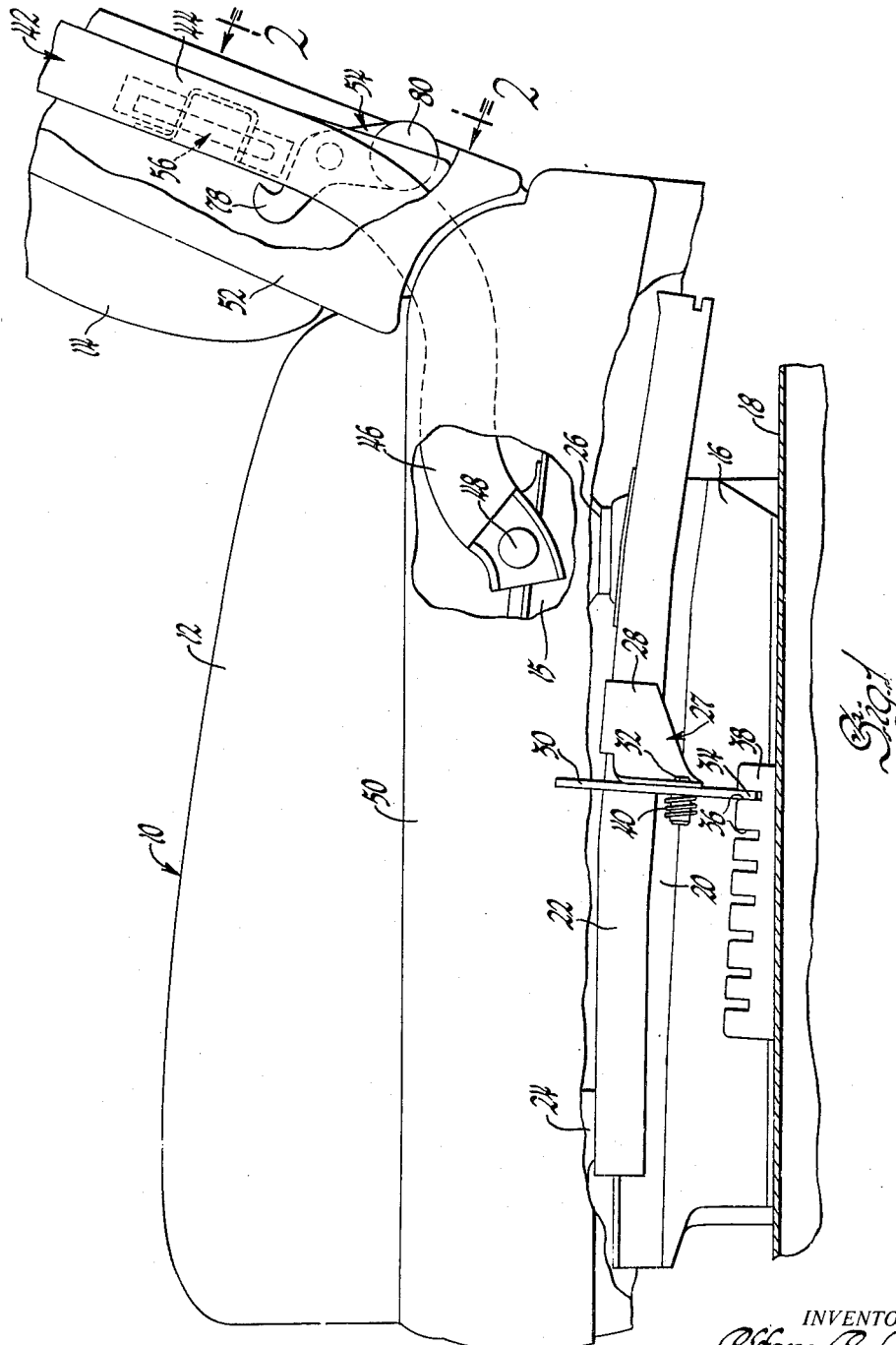
INVENTOR.
Alfons A. Limberg
BY
Paul Fitzpatrick
ATTORNEY

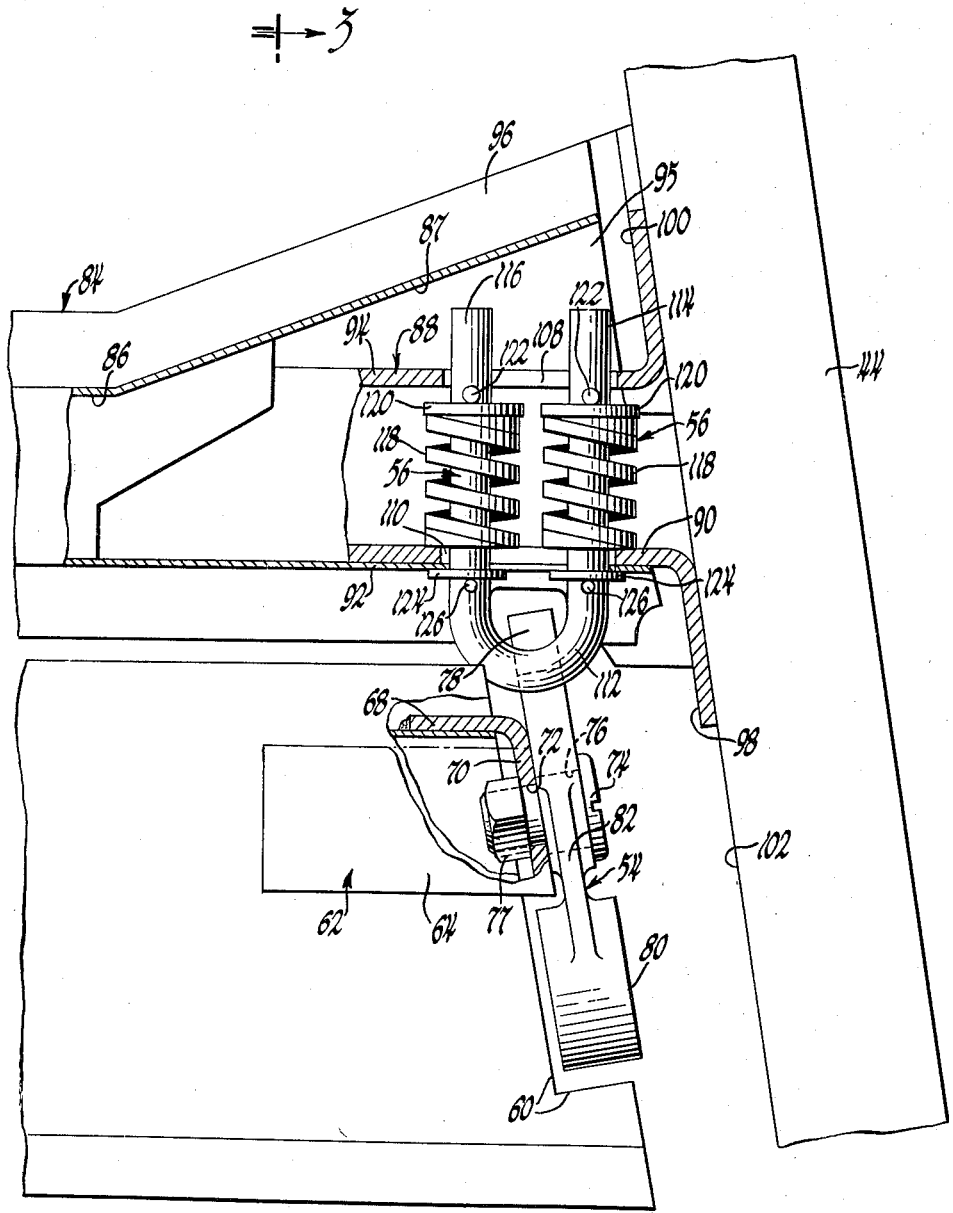

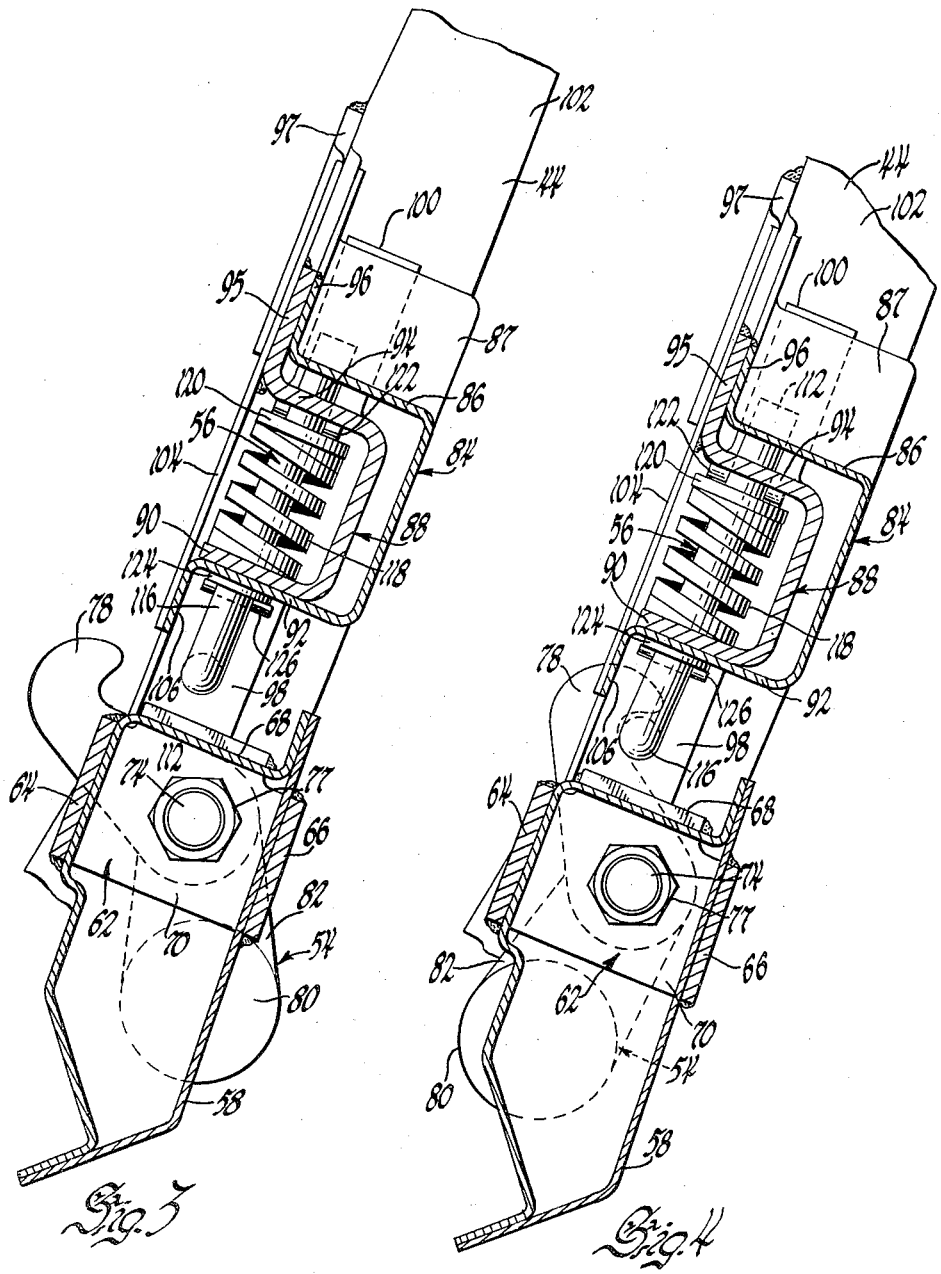

United States Patent Office 2,864,432
Patented Dec. 16, 1958

2,864,432

INERTIA LATCH FOR VEHICLE SEATS

Alfons A. Limberg, Grosse Pointe, Mich., assignor to General Motors Corporation, Detroit, Mich., a corporation of Delaware Application November 21, 1955, Serial No. 547,979

9 Claims. (Cl. 155—161)

This invention relates to an inertia latch for vehicle seats and more particularly to an inertia latch for vehicle seats having tilting seat backs.

Many present vehicles of the two-door body type have a front seat provided with a split seat back wherein either one or both of the seat backs is tiltable forwardly of the vehicle to facilitate entrance and exit of the rear seat passengers. The seat backs have a tendency to tilt forwardly upon a sudden deceleration of the vehicle which is annoying to the driver and other front seat passengers. When passengers are occupying the rear seat and the vehicle stops suddenly, these passengers have a tendency to shift forwardly and may push against the front seat backs, causing the seat backs to tilt and pin the driver against the steering wheel or push the other front seat passengers out of the seat or against the vehicle dashboard. It is extremely desirable to prevent tilting movement of the seat backs upon a sudden deceleration of the vehicle and yet allow for normal tilting movement of the seat backs to facilitate entrance and exit of the rear seat passengers.

This invention provides an inertia latch which normally allows tilting movement of the seat back but which is operative upon a sudden deceleration of the vehicle to lock the seat backs in place and prevent tilting movement thereof. The inertia latch of this invention is similar to those shown in S. N. 321,170 Semar, filed November 18, 1952, now Patent No. 2,737,229, and S. N. 333,651 Williams, filed January 28, 1953, now Patent No. 2,732,003, both assigned to the assignee of the present invention.

In its preferred embodiment, the inertia latch of this invention provides an improved keeper structure which includes a keeper bar supported on the seat back frame by compression springs so as to be yieldable relative thereto upon engagement with the latch member. The compression springs reduce the impact force taken by the keeper bar since the springs absorb this force and distribute it to the seat back frame. The keeper structure of this invention is also positioned above the seat cushion closer to the point of expected loads on the seat back to further reduce the impact force on the keeper structure. By so positioning the keeper structure, the moment arm between the point of expected loads and the point of engagement of the latch member with the keeper bar is decreased relative to the lever arm between the point of expected loads and the pivotal support of the back frame. The point of expected loads is above the keeper structure since it includes both the inertia force of the seat back and any force exerted against the seat back by a rear seat passenger.

An object of this invention is to provide an inertia latch for vehicle seats having tilting seat backs to lock the seat back in place upon a sudden deceleration of the vehicle. Another object of this invention is to provide an inertia latch for vehicle seats having tilting seat backs which includes a yieldable keeper bar to reduce the impact force taken by the bar. A further object of this invention is to provide an inertia latch for vehicle seats having tilting seat backs wherein the keeper structure is positioned above the seat cushion closer to the point of expected loads on the seat back to reduce the impact force taken by the keeper bar. These and other objects of this invention will be readily apparent from the following specification and drawings, in which:

Figure 1 is a side elevational view of a vehicle seat embodying an inertia latch according to this invention, with portions of the seat being broken away;

Figure 2 is a rear elevational view of the inertia latch mechanism of Figure 1 with portions of the latch being broken away;

Figure 3 is a view taken on the plane indicated by line 3—3 of Figure 2 showing the inertia latch in normal position; and Figure 4 is a view similar to Figure 3 showing the inertia latch in locked position.

Referring now to Figure 1 of the drawings, a vehicle seat 10 includes a base cushion 12 and a back cushion 14. The base cushion 12 is mounted on a base frame 15 which is supported on the floor of the vehicle for longitudinal movement relative thereto in order to adjust the horizontal position of the seat. The adjusting mechanism includes a base support 16 secured to the vehicle floor pan 18, a lower track member 20 secured to base support 16, and an upper track member 22 slidable on the lower track member and secured to the base frame 15 at 24 and 26. Suitable anti-friction elements are provided between the upper and lower track members as is well known. A latch 27 is provided to hold the seat in any horizontally adjusted position. The latch includes a bracket 28 secured to the upper track 22 and a latch arm 30 pivotally mounted on bracket 28 at 32 and including a dog portion 34 engageable within any one of a number of slots 36 in a keeper bracket 38 fixed to the vehicle floor pan 18. A spring 40 biases the latch arm 30 to locked position. It will be understood that both sides of the seat are supported by the similar adjuster mechanism. Either a single latch may be provided on the driver's side of the seat or latches provided on both sides of the seat which are operatively interconnected so that both are operable from only one side of the seat.

Each back cushion 14 is mounted on a back frame 42 which is pivotally supported on base frame 15. Each back frame includes depending arms on each side of the back cushion, with the outboard arm 44 having a forwardly extending arcuate terminal portion 46 pivotally mounted on base support 15 at 48 and the inboard arm (not shown) having a similar pivotal support located to the rear of pivot support 48 so that the seat back is tiltable forwardly of the vehicle about an axis over the rear outboard corner of base cushion 12. A trim pad 50 is secured to the side of base frame 15 in spaced relationship to the side of the base cushion 12 in order to conceal portion 46 of arm 44 and a trim pad 52 is secured to back frame 42 to conceal the remainder of arm 44. The inertia latch of this invention is shown schematically in Figure 1 and includes a latch member 54 pivotally supported by the base frame 15 and a keeper structure 56 supported by the back frame 42. It will be understood that the inertia latch may be provided for either or both of the tilting seat backs.

Referring now to Figures 2, 3, and 4 of the drawings, the inertia latch will be particularly described. Base frame 15 includes a rear transverse member 58 of box cross section, and an end of this member is cut away at 60, Figure 2, to provide space for the latch member 54. A bracket 62 is secured to the end of member 58 to provide a pivotal support for latch member 54. Bracket 62 includes leg 64 welded to the forward face of member 58, leg 66 welded to the rear face of member 58, and leg 68 welded to the upper face of member 58. The web 70 of bracket 62 is apertured at 72 and a bolt 74 extending through an aperture 76 in latch member 54 and aperture 72 pivotally mounts the latch member on bracket 62. The bolt is retained in place by a nut 77.

The latch member 54 includes an upper hooked shaped portion 78 and a lower pendulum portion 80 integrally connected to the hooked portion by a rib portion 82. The latch member is freely swingable on bolt 74 with the swinging movement of the latch member being controlled by the pendulum portion 80 in response to a change in acceleration of the vehicle.

A channel-shaped transverse member 84 extends between the depending arms of the back frame 42. The upper wall 86 of member 84 tapers upwardly at 87 to provide space for the keeper structure 56. A U-shaped bracket 88 has the lower leg 90 thereof welded to the lower wall 92 of member 84 and the upper leg 94 thereof provided with a laterally extending flange 95 which is welded to flange 96 of wall 86. An offset flange portion 97 of flange 95 is welded to the forward face of arm 44. A pair of flanges 98 and 100 extend laterally from the lower and upper legs 90 and 94, respectively, of bracket 88 and are welded to the inboard face 102 of arm 44. A plate 104 is welded to flange 95 of bracket 88 and flange 106 of wall 92 to close the opening of bracket 88 and provide a housing therein.

The upper wall 94 of bracket 88 is slotted at 108 and the lower wall 90 of the bracket is slotted at 110 substantially in alignment with slot 108. A U-shaped keeper bar 112 has the legs 114 and 116 thereof positioned within slots 108 and 110. A coil spring 118 encircles each leg of the keeper bar, with the lower end of the spring bearing against the lower leg 90 of bracket 88 and the upper end of the spring bearing against a washer 120 which is retained in place by a pin 122 extending through a respective leg of the keeper bar. The springs are initially placed under slight compression when the keeper bar is mounted on bracket 88 and this compression is retained in each spring by a washer 124 positioned on a respective leg of the keeper bar and retained in place by a pin 126. By placing springs 118 under a slight compression, the keeper bar is held in place on bracket 88 and rattling is prevented during movement of the vehicle.

Referring now to Figures 1, 3, and 4 the operation of the inertia latch will be described. Figures 1 and 3 show the inertia latch in normal position with latch member 54 out of engagement with the keeper bar 112. In this position of the latch member, the seat back can be tilted forwardly about pivot 48 and the pivot on the inboard side of the seat back without any interference between the latch member and the striker bar. Thus, the seat back can be tilted forwardly and rearwardly at will to facilitate entrance and exit of rear seat passengers. Upon a sudden deceleration of the vehicle the seat back tends to tilt forwardly due to inertia. The change in acceleration also causes pendulum portion 80 of the latch member to swing the latch member clockwise about pivot 74 so that the hook-shaped portion 78 of the latch member engages the keeper bar 112 to lock the seat back and stop the forward tilting movement thereof. When the deceleration of the vehicle becomes less rapid or the vehicle again accelerates, the latch member returns to normal position out of engagement with the keeper bar.

When the seat back is locked upon a sudden deceleration of the vehicle, the inertia of the seat back causes the latch member to exert an impact force on the keeper bar which tends to pull the bar downwardly from the back frame. By yieldingly mounting the keeper bar on the back frame through compression springs, the keeper bar is allowed to shift downwardly upon engagement with the latch member and the impact force on the keeper bar is absorbed by the springs and distributed to the back frame. This prevents any bending or breaking of the keeper bar and also prevents bending of arm 44 of the back frame. As previously mentioned, the rear seat passengers have a tendency to shift forwardly of the vehicle upon a sudden deceleration thereof and push against the upper portion of the seat back. This force when added to the inertia force of the seat back increases the impact force exerted on the keeper bar by the latch member to increase the possibility of bending or breaking the bar. The compression springs operate to absorb this additional impact force and distribute it to the back frame.

It should be noted that the keeper bar 112 is mounted on the seat back in a position above the seat cushion and closer to the point of expected loads, either the inertia force of the seat back or this force plus the force exerted against the seat back by a rear seat passenger. By so mounting the keeper structure, the moment arm between the point of expected load and the point of engagement of the latch member with the keeper bar is decreased to reduce the mechanical advantage of the lever arm between the point of expected load and pivot 48. This will reduce the impact force exerted by the latch member on the keeper bar. The location of the keeper bar also allows the bar to be mounted on a back frame cross member so that the impact force absorbed by the compression springs can be distributed through the entire back frame.

Thus, the invention provides a new and improved inertia latch for vehicle seats having tilting seat backs which is operable to lock the seat back upon a sudden deceleration of the vehicle and yet allow normal tilting movement of the seat back to facilitate entrance and exit of rear seat passengers. The inertia latch includes an improved keeper structure which is yieldable upon engagement with the latch member so as to absorb the impact force on the keeper bar due to the inertia force of the seat back and any force applied against the seat back by a rear seat passenger. The keeper structure is also mounted on the seat back frame about the seat cushion to decrease the mechanical advantage of the lever arm between the point of expected load and a pivot of the seat back so as to further decrease the impact force on the keeper bar and allow this force to be dissipated through the entire seat frame.

While a specific embodiment of this invention has been shown and described, various changes and modifications may be made within the scope and spirit of the invention.

I claim:

1. In a vehicle, a seat including a cushion base frame and a tiltable back frame pivotally mounted on said cushion base frame, keeper means yieldably supported on one of said frames, an acceleration responsive pendulum latch member, and means movably supporting said latch member on the other of said frames for movement thereof into engagement with said keeper means upon deceleration of said vehicle to limit tilting movement of said back frame, said keeper means being yieldable relative to said one of said frames upon engagement of said latch member with said keeper means.

2. In a vehicle, a seat including a cushion base frame and a tiltable back frame pivotally mounted on said cushion base frame, keeper means yieldably supported on said back frame, and a deceleration responsive pendulum latch member pivotally supported on said base frame and being swingable into engagement with said keeper means upon deceleration of said vehicle to limit tilting movement of said back frame, said keeper means being yieldable relative to said back frame upon engagement of said latch member with said keeper means to reduce the impact force on said keeper means.

3. In a vehicle, a seat including a cushion base frame and a tiltable back frame having depending arms pivotally mounted on said cushion base frame, keeper means yieldably supported on said seat back frame adjacent one of said depending arms, and a deceleration responsive pendulum latch member pivotally supported on said cushion base frame and being swingable into engagement with said keeper means upon deceleration of said vehicle to limit tilting movement of said seat back frame, said keeper means being yieldable relative to said back frame upon engagement of said latch member with said keeper means to reduce the impact force on said keeper means.

4. In a vehicle, a seat including a cushion base frame and a tiltable back frame pivotally mounted on said cushion base frame, keeper means yieldably supported on said back frame above a seat cushion on said base frame, and a deceleration responsive pendulum latch member pivotally supported on said base frame and being swingable into engagement with said keeper means upon deceleration of said vehicle to limit tilting movement of said seat back frame, said keeper means being yieldable relative to said back frame upon engagement of said latch member with said keeper means to reduce the impact force on said keeper means.

5. In a vehicle, a seat including a cushion base frame and a tiltable back frame pivotally mounted on said base frame, keeper means yieldably supported on said back frame for shifting movement in a substantial vertical plane, a deceleration responsive pendulum latch member pivotally supported on said cushion base frame and being swingable into engagement with said keeper means upon deceleration of said vehicle to limit tilting movement of said seat back member, said keeper means being shiftable relative to said back frame in said vertical plane upon engagement of said latch member with said keeper means to reduce the impact force on said keeper means.

6. In a vehicle, a seat including a cushion base frame and a tiltable back frame pivotally mounted on said cushion base frame, keeper means yieldably supported on said back frame for shifting movement substantially within the plane of said frame, a deceleration responsive pendulum latch member pivotally supported on said base frame and being swingable into engagement with said keeper means upon deceleration of said vehicle to limit tilting movement of said back frame, said keeper means being shiftable relative to said back frame within the plane thereof upon engagement of said latch member with said keeper means to reduce the impact force on said keeper means.

7. In a vehicle, a seat including a cushion base frame and a tiltable back frame pivotally mounted on said cushion base frame, keeper means yieldably supported on said seat back frame above a seat cushion on said base frame for shifting movement substantially within the plane of said back frame, a deceleration responsive pendulum latch member pivotally supported on said base frame and being swingable into engagement with said keeper means upon deceleration of said vehicle to limit tilting movement of said back frame, said keeper means being shiftable relative to said back frame within the plane thereof upon engagement of said latch member with said keeper means to reduce the impact force on said keeper means.

8. In a vehicle, a seat including a cushion base frame and a tiltable back frame pivotally mounted on said cushion base frame, keeper means yieldably supported on said back frame for shifting movement substantially within the plane of said frame, said keeper means including a keeper bar and resilient means operatively secured to said bar to bias said bar in a direction away from a pivotal support of said back frame, a deceleration responsive pendulum latch member pivotally supported on said base frame and being swingable into engagement with said keeper means upon deceleration of said vehicle to limit tilting movement of said back frame, said keeper means being yieldable relative to said back frame in a direction toward the pivotal support of said back frame upon engagement of said latch member with said keeper bar to reduce the impact force on said keeper bar.

9. In a vehicle, a seat including a cushion base frame and a tiltable back frame pivotally mounted on said cushion base frame, keeper means yieldably supported on said back frame for shifting movement substantially within the plane of said frame, said keeper means including a U-shaped keeper bar and resilient means operatively secured to the legs of said bar to bias said bar in a direction away from a pivotal support of said back frame, a deceleration responsive pendulum latch member pivotally supported on said base frame and being swingable into engagement with said keeper bar upon deceleration of said vehicle to limit tilting movement of said back frame, said keeper means being shiftable relative to said back frame in a direction toward the said pivotal support of said back frame upon engagement of said latch member with said keeper bar to reduce the impact force on said keeper bar.

References Cited in the file of this patent

UNITED STATES PATENTS

| 722,372 | Luppins | Mar. 10, 1903 |
| 1,752,368 | Brunn | Apr. 1, 1930 |
| 2,487,428 | Earnest | Nov. 8, 1949 |
| 2,559,548 | Seigneur | July 3, 1951 |
| 2,732,003 | Williams | Jan. 24, 1956 |
| 2,737,229 | Semar | Mar. 6, 1956 |

FOREIGN PATENTS

| 8,449 | Great Britain | 1890 |